United States Patent
Theobald

(10) Patent No.: US 10,509,854 B2
(45) Date of Patent: Dec. 17, 2019

(54) ANNOTATION PROCESSING OF COMPUTER FILES

(71) Applicant: Dietmar Theobald, Karlsruhe (DE)

(72) Inventor: Dietmar Theobald, Karlsruhe (DE)

(73) Assignee: SAP SE, Walldorf (DE)

( * ) Notice: Subject to any disclaimer, the term of this patent is extended or adjusted under 35 U.S.C. 154(b) by 978 days.

(21) Appl. No.: 14/617,570

(22) Filed: Feb. 9, 2015

(65) Prior Publication Data

US 2015/0154169 A1 Jun. 4, 2015

Related U.S. Application Data

(63) Continuation of application No. 12/184,911, filed on Aug. 1, 2008, now Pat. No. 8,954,840.

(60) Provisional application No. 60/953,935, filed on Aug. 3, 2007.

(51) Int. Cl.
| | |
|---|---|
| *G06F 17/24* | (2006.01) |
| *G06F 16/11* | (2019.01) |
| *G06K 15/00* | (2006.01) |
| *G06F 8/73* | (2018.01) |

(52) U.S. Cl.
CPC .......... *G06F 17/241* (2013.01); *G06F 16/113* (2019.01); *G06F 8/73* (2013.01); *G06K 15/00* (2013.01)

(58) Field of Classification Search
CPC .... G06F 9/465; G06F 17/2247; G06F 17/272; G06F 8/73; G06F 16/113; G06F 17/241; H04L 65/607; G06K 15/00
See application file for complete search history.

(56) References Cited

U.S. PATENT DOCUMENTS

| | | | |
|---|---|---|---|
| 4,760,523 | A | 7/1988 | Yu et al. |
| 4,945,475 | A * | 7/1990 | Bruffey .............. G06F 17/30091 |
| 5,907,703 | A | 5/1999 | Kronenberg et al. |
| 6,182,281 | B1 | 1/2001 | Nackman et al. |
| 6,275,223 | B1 | 8/2001 | Hughes |
| 6,353,925 | B1 | 3/2002 | Stata et al. |

(Continued)

OTHER PUBLICATIONS

"6570P471 OA DATED Oct. 29, 2008 for U.S. Appl. No. 11/648,065", USPTO, (Oct. 29, 2008), 20 pgs.

(Continued)

*Primary Examiner* — Wilson W Tsui
(74) *Attorney, Agent, or Firm* — Schwegman Lundberg & Woessner, P.A.

(57) ABSTRACT

A method and apparatus for annotation processing of computer files. An embodiment of A method for processing a data stream includes receiving a data stream input at a scanner component, where the data stream input represents multiple program elements. The data stream input is scanned for annotations, with scanning the data stream input including: encountering a description of a data type; informing a handler component regarding the data type description; determining whether to process program elements within the data type, with the determination being based at least in part on any messages received from the handler component indicating that data type is not of interest; and, if there is a determination to process the program elements in the data type, scanning the program elements of the type to identify annotated program elements and associated annotation values.

20 Claims, 9 Drawing Sheets

(56) References Cited

U.S. PATENT DOCUMENTS

| | | | |
|---|---|---|---|
| 6,356,946 | B1 | 3/2002 | Clegg et al. |
| 6,438,559 | B1* | 8/2002 | White .................. G06F 16/289 |
| 6,510,156 | B1* | 1/2003 | Brock ................ H04L 12/5601 |
| | | | 370/392 |
| 6,519,603 | B1 | 2/2003 | Bays et al. |
| 6,567,815 | B1 | 5/2003 | Rubin et al. |
| 6,675,375 | B1 | 1/2004 | Czajkowski |
| 6,694,323 | B2 | 2/2004 | Bumbulis |
| 6,856,993 | B1 | 2/2005 | Verma et al. |
| 7,318,193 | B2 | 1/2008 | Kim et al. |
| 7,376,831 | B2 | 5/2008 | Kollmyer et al. |
| 7,499,956 | B1 | 3/2009 | Darcy et al. |
| 7,562,342 | B2* | 7/2009 | Berg ......................... G06F 8/73 |
| | | | 717/104 |
| 7,565,364 | B1 | 7/2009 | Darcy et al. |
| 7,668,812 | B1 | 2/2010 | Riley et al. |
| 7,685,327 | B1 | 3/2010 | Jacobson et al. |
| 7,788,657 | B2* | 8/2010 | Wannamaker ........ G06F 8/4434 |
| | | | 717/118 |
| 7,966,602 | B1 | 6/2011 | Webster et al. |
| 8,141,036 | B2 | 3/2012 | Wagner et al. |
| 8,271,942 | B2 | 9/2012 | Nigul et al. |
| 8,438,468 | B2 | 5/2013 | Berg et al. |
| 8,463,724 | B2 | 6/2013 | Theobald |
| 8,806,324 | B2 | 8/2014 | Theobald |
| 8,954,840 | B2 | 2/2015 | Theobald |
| 9,460,064 | B2* | 10/2016 | Chandrasekar ... G06F 17/30917 |
| 2002/0042833 | A1* | 4/2002 | Hendler ............ H04L 29/06027 |
| | | | 709/231 |
| 2002/0176418 | A1* | 11/2002 | Hunt ..................... H04L 49/103 |
| | | | 370/389 |
| 2002/0178439 | A1 | 11/2002 | Rich et al. |
| 2003/0018614 | A1 | 1/2003 | Hayes et al. |
| 2004/0049371 | A1 | 3/2004 | Fraer et al. |
| 2004/0088681 | A1 | 5/2004 | Berg et al. |
| 2004/0093329 | A1 | 5/2004 | Von Bergen et al. |
| 2004/0111701 | A1 | 6/2004 | Beust |
| 2004/0123285 | A1 | 6/2004 | Berg et al. |
| 2004/0249805 | A1 | 12/2004 | Chuvilskiy |
| 2004/0267732 | A1 | 12/2004 | Luk et al. |
| 2005/0033740 | A1 | 2/2005 | Cao et al. |
| 2005/0131867 | A1 | 6/2005 | Wilson |
| 2005/0187962 | A1 | 8/2005 | Grondin et al. |
| 2005/0216445 | A1 | 9/2005 | Rao |
| 2005/0275603 | A1 | 12/2005 | Park |
| 2006/0020645 | A1 | 1/2006 | Hasegawa et al. |
| 2006/0179087 | A1 | 8/2006 | Fujii et al. |
| 2006/0236222 | A1* | 10/2006 | Marmigere ........... G06F 17/272 |
| | | | 715/234 |
| 2007/0038610 | A1 | 2/2007 | Omoigui |
| 2007/0214163 | A1* | 9/2007 | Luo .................. G06F 17/30442 |
| 2008/0235661 | A1 | 9/2008 | Arpana et al. |
| 2008/0244537 | A1 | 10/2008 | Wintergerst et al. |
| 2009/0007195 | A1 | 1/2009 | Beyabani |
| 2009/0024604 | A1 | 1/2009 | Zhao et al. |
| 2009/0037357 | A1 | 2/2009 | Theobald |
| 2009/0037459 | A1 | 2/2009 | Theobald |
| 2009/0037804 | A1 | 2/2009 | Theobald |
| 2009/0037805 | A1 | 2/2009 | Theobald |
| 2011/0022941 | A1 | 1/2011 | Osborne et al. |

OTHER PUBLICATIONS

"A Program Annotation Facility for the Java Programming Language", JSR-175 Public Draft Specification, (2002-2003), 1-34.

"U.S. Appl. No. 12/184,896, Final Office Action dated Apr. 24, 2012", 23 pgs.

"U.S. Appl. No. 12/184,896, Non Final Office Action dated Sep. 7, 2011", 25 pgs.

"U.S. Appl. No. 12/184,896, Non Final Office Action dated Oct. 26, 2012", 15 pgs.

"U.S. Appl. No. 12/184,896, Notice of Allowance dated Feb. 8, 2013", 5 pgs.

"U.S. Appl. No. 12/184,896, Response filed Jan. 24, 2013 to Non Final Office Action dated Oct. 26, 2012", 13 pgs.

"U.S. Appl. No. 12/184,896, Response filed Jul. 25, 2012 to Final Office Action dated Apr. 24, 2012", 12 pgs.

"U.S. Appl. No. 12/184,896, Response filed Nov. 18, 2011 to Non Final Office Action dated Sep. 7, 2011", 14 pgs.

"U.S. Appl. No. 12/184,915 , Response filed Aug. 31, 2012 to Final Office Action dated Jun. 1, 2012", 11 pgs.

"U.S. Appl. No. 12/184,915 , Response filed Sep. 11, 2013 to Non Final Office Action dated Jun. 28, 2013", 11 pgs.

"U.S. Appl. No. 12/184,915, Final Office Action dated Jan. 6, 2012", 10 pgs.

"U.S. Appl. No. 12/184,915, Final Office Action dated Jun. 1, 2012", 10 pgs.

"U.S. Appl. No. 12/184,915, Non Final Office Action dated Jun. 8, 2011", 13 pgs.

"U.S. Appl. No. 12/184,915, Non Final Office Action dated Jun. 28, 2013", 10 pgs.

"U.S. Appl. No. 12/184,915, Non Final Office Action dated Nov. 20, 2012", 10 pgs.

"U.S. Appl. No. 12/184,915, Notice of Allowance dated Jan. 15, 2014", 8 pgs.

"U.S. Appl. No. 12/184,915, Pre-Appeal Brief Request filed Apr. 3, 2012", 5 pgs.

"U.S. Appl. No. 12/184,915, Response filed Sep. 2, 2011 to Non Final Office Action dated Jun. 8, 2011", 12 pgs.

"U.S. Appl. No. 12/184,924 , Appeal Brief filed Jul. 15, 2013", 13 pgs.

"U.S. Appl. No. 12/184,924, Decision on Pre-Appeal Brief Request dated May 2, 2013", 2 pgs.

"U.S. Appl. No. 12/184,924, Examiner Interview Summary dated Oct. 18, 2012", 3 pgs.

"U.S. Appl. No. 12/184,924, Examiner's Answer to Appeal Brief dated Oct. 28, 2013", 17 pgs.

"U.S. Appl. No. 12/184,924, Final Office Action dated Feb. 14, 2013", 16 pgs.

"U.S. Appl. No. 12/184,924, Final Office Action dated Oct. 31, 2011", 19 pgs.

"U.S. Appl. No. 12/184,924, Non Final Office Action dated Jul. 11, 2011", 20 pgs.

"U.S. Appl. No. 12/184,924, Non Final Office Action dated Aug. 2, 2012", 16 pgs.

"U.S. Appl. No. 12/184,924, Pre-Appeal Brief Request filed Apr. 15, 2013", 4 pgs.

"U.S. Appl. No. 12/184,924, Reply Brief filed Dec. 9, 2013", 6 pgs.

"U.S. Appl. No. 12/184,924, Response filed Jan. 19, 2012 to Final Office Action dated Oct. 31, 2011", 12 pgs.

"U.S. Appl. No. 12/184,924, Response filed Oct. 10, 2011 to Non Final Office Action dated Jul. 11, 2011", 18 pgs.

"U.S. Appl. No. 12/184,924, Response filed Nov. 20, 2012 to Non Final Office Action dated Aug. 2, 2012", 10 pgs.

"U.S. Appl. No. 12/849,915, Response filed Feb. 20, 2013 to Non Final Office Action dated Nov. 20, 2012", 12 pgs.

"Getting Started with the Annotation Processing Tool (apt)", http://java.sun.com/j2se/1.5.0/docs/guide/apt/GettingStarted.html, (2004), 1-8.

"Package—Java 2 Platform Standard Edition Version 1.4.2", http://java.sun.com/j2se/1.4.2/docs/api/java/io/package-summary.html, (2003), 1-6.

Eclipse, "Source viewers and annotations", <http://help.eclipse.org/juno/index.jsp?topic=%2Forg.eclipse.platform.doc.isv%2Fguide%2Feditors_annotations.htm>, (Oct. 3, 2003), 1-6.

Gosling, James, et al., "The Java Language Specification Third Edition", Addison Wesley, (May 2005), 259-286 & 356-358.

"U.S. Appl. No. 12/184,924, Appeal Decision dated Feb. 1, 2016", 9 pgs.

"U.S. Appl. No. 12/184,915, Notice of Allowance dated Apr. 25, 2014", 12 pgs.

* cited by examiner

ANNOTATION PROCESSING OF COMPUTER FILES

RELATED APPLICATIONS

This application is a continuation of U.S. patent application Ser. No. 12/184,911 filed Aug. 1, 2008, which claims priority to U.S. provisional patent application 60/953,935, filed Aug. 3, 2007, which applications are incorporated herein by reference in their entirety.

This application is further related to:

U.S. patent application Ser. No. 11/648,065, entitled "Computer File System Traversal", filed Dec. 30, 2006;

U.S. patent application Ser. No. 12/184,896, entitled "Computer Archive Traversal", filed Aug. 1, 2008, claiming priority to U.S. provisional application 60/953,932, filed Aug. 3, 2007;

U.S. patent application Ser. No. 12/184,904, entitled "Computer File Processing", filed Aug. 1, 2008; claiming priority to U.S. provisional application 60/953,933, filed Aug. 3, 2007;

U.S. patent application Ser. No. 12/184,915, "Annotation Data Filtering of Computer Files", filed Aug. 1, 2008, claiming priority to U.S. provisional application 60/953,937, filed Aug. 3, 2007;

U.S. patent application Ser. No. 12/184,924, entitled "Annotation Data Handlers for Data Stream Processing", filed Aug. 1, 2008, claiming priority to U.S. provisional application 60/953,938, filed Aug. 3, 2007;

U.S. patent application Ser. No. 12/184,932, entitled "Dependency Processing of Computer Files", filed Aug. 1, 2008, claiming priority to U.S. provisional application 60/953,963, filed Aug. 3, 2007; and U.S. patent application Ser. No. 12/184,938, entitled "Data Listeners for Type Dependency Processing", filed Aug. 1, 2008, claiming priority to U.S. provisional application 60/953,964, filed Aug. 3, 2007.

TECHNICAL FIELD

Embodiments of the invention generally relate to the field of computer systems and, more particularly, to a method and apparatus for annotation processing of computer files.

BACKGROUND

Computer files, such as Java class files, may have specific standard formats. The standard formats of computer may limit the data that can be provided in relation to the files. For this reason, annotations may be provided to add additional information regarding computer files Annotations may potentially be found anywhere within a set of computer files.

In a particular example, Java allows annotations to Java class files, with the practice now being specifically described in annotations under Java release 5.0 (Java under the JDK (Java Development Kit) 5.0) as provided in JSR-175 recommendation regarding code annotations. The annotations may add guidance regarding certain class files. Thus, a Java class file may include one or more annotations associated with program elements.

It may become necessary or useful to determine what annotations are present in a set of computer files. However, locating annotations within files can be time consuming and inefficient because the process generally requires searching through all of the files, which may be in the form of a hierarchical file structure or contained within an archive.

SUMMARY OF THE INVENTION

A method and apparatus are provided for annotation processing of computer files.

In a first aspect of the invention, an embodiment of a method includes receiving a data stream input at a scanner component, where the data stream input represents multiple program elements. The data stream input is scanned for annotations, with scanning the data stream input including: encountering a description of a data type; informing a handler component regarding the data type description; determining whether to process program elements within the data type, with the determination being based at least in part on any messages received from the handler component indicating that the data type is not of interest; and, if there is a determination to process the program elements in the data type, scanning the program elements of the type to identify annotated program elements and associated annotation values.

In a second aspect of the invention, a embodiment of a system includes a data scanning module, where the data scanning module is to receive a data stream input containing multiple program elements and is to scan the data stream input for annotations to the program elements, the data scanning module to provide notice when a data type description is encountered. The system further includes a data handling module, where the data handling module is to receive the notice regarding the data type description, the data handling module to provide a callback control flow to notify the data scanning module if the data type is not of interest.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
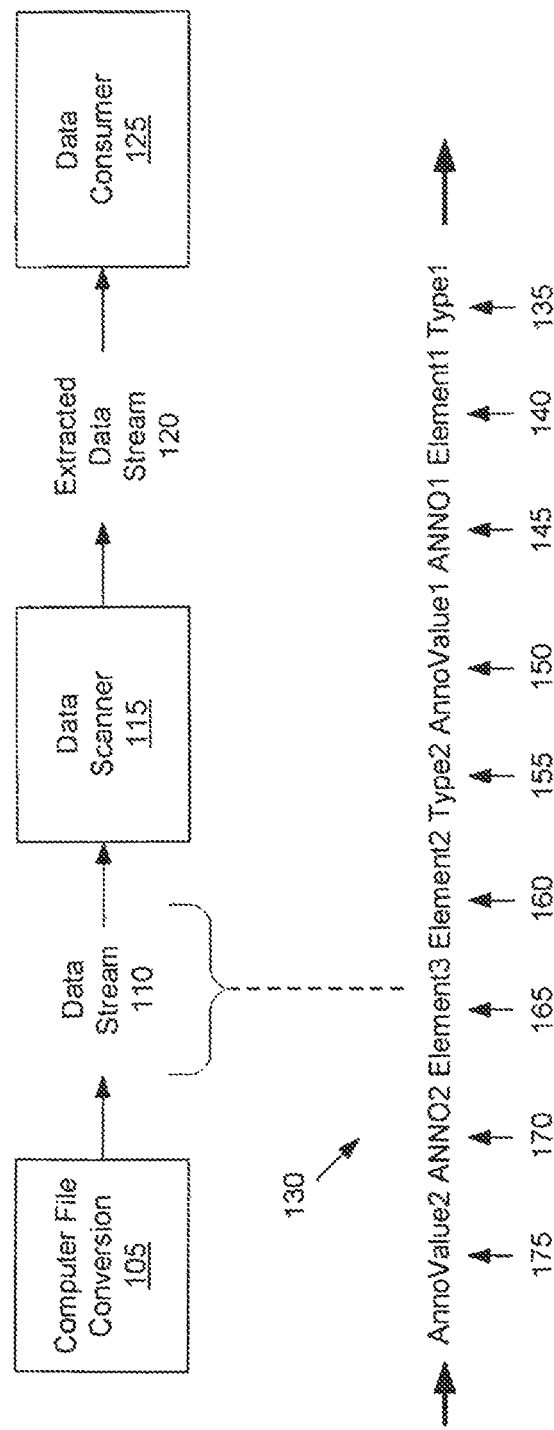
FIG. 1 is an illustration of an embodiment of processing of computer file data.

Embodiments of the invention are generally directed to annotation processing of computer files.

As used herein:

"Annotation" means additional information or metadata that is associated with or attached to a particular point in a computer program. The term annotation includes formal and informal annotation methods, including, but not limited to, annotations under Java release 5.0 (Java under the JDK (Java Development Kit) 5.0) as provided in JSR (Java Specification Request) 175 recommendation regarding code annotations ("A Metadata Facility for the Java Programming Language").

"Computer file" means any file structure used in a computer system. Computer files include files with specific required structures, including Java class files.

"Class file" means a Java class file. A Java class file is a defined format for compiled Java code, which may then be loaded and executed by any Java virtual machine. The format and structure for a Java class file is provided in JSR 000202, Java Class File Specification Update (Oct. 2, 2006) and subsequent specifications.

"Traversal" means a process for progressing through the elements of a computer system, including a process for progressing through the elements of a computer archive.

"Archive" means a single file that may contain one or more separate files. An archive may also be empty. The files within an archive are extracted, or separated, from the archive for use by a computer program. The files contained within an archive are commonly compressed, and the compressed files are decompressed prior to use. An archive may further include data required to extract the files from the archive. "Archive" may also refer to act of transferring one or more files into an archive.

In an embodiment of the invention, processing of computer files to identify annotations is provided. In an embodiment, the computer files are in the form of a serial data stream, with the data stream being scanned for annotation occurrences. In one embodiment, a set of computer files includes a set of Java class files, where the Java class files include one or more annotations.

The Java platform has included various ad hoc mechanisms to provide annotations. Java release 5.0 (Java under the JDK (Java Development Kit) 5.0) includes a formal general purpose annotation (or metadata) facility, as provided in the JSR-175 recommendation regarding code annotations. The annotation facility permits a user to define and use the user's own annotation types. The facility includes a syntax for declaring annotation types, a syntax for annotating declarations, APIs for reading annotations, a class file representation for annotations, and an annotation processing tool Annotations generally allow programmers to add attributes to computer code, including Java code. These attributes may be used for multiple purposes, including code documentation, code generation, and, during runtime, for providing special services such as enhanced business-level security or special business logic.

In an embodiment of the invention, annotation data is extracted into a neutral format to allow efficient filtering of annotations of interest. The annotations in a data stream are provided in a form to allow a scanner to address the elements in a data stream. In an embodiment, a type definition appears prior to any annotations on the elements of the particular type. In an embodiment, there is further an annotation announcement appearing directly before reporting the annotation value, thus informing a scanner to be forewarned that an annotation will follow.

In an embodiment of the invention, a process is provided to receive a data stream input representing a computer program or other computer files, scan the data stream for instances of annotations, and to generate a data stream output. The data stream output includes selected annotated elements and annotation values.

In an embodiment of the invention, a processing system includes a scanning module to scan the data stream input and output a data stream that includes selected annotated elements and annotation values. In an embodiment, the processing system further includes a handler module to handle the data stream output. In an embodiment, the handler module further provides feedback to the scanning module to direct the selection of annotations by the scanning module. In an embodiment, the file processor may include additional handlers to provide other functions. In one embodiment of the invention, a dedicated, independent processing module is provided for annotation processing, but embodiments of the invention are not limited to a dedicated module implementation.

In an embodiment of the invention, a scanner operates by sending data to the handler as it is identified in the data stream. In an embodiment, a type definition is thus received before receiving any of the program elements within the type, and thus also prior to any annotation value for the program elements within the type. In this manner, the handler may receive a type definition and may provide a callback to the scanner if the handler is not interested in annotations for type definition. If the handler indicates that it is not interested in any annotations for the type definition, the scanner may then skip any annotation values for the type definition.

In an embodiment of the invention, a set of computer files are processed in a single pass as a serial data stream without requiring multiple readings of the file data. In an embodiment, the same serial data stream format is maintained both on input and output, thereby allowing further processing of class files without further file conversion. In an embodiment, the same data format is used for the data input and the data output. In an embodiment, the data stream conversion allows processing without any dependency on random access files, and broadens the applicable scope of the process for the input. In an embodiment, the processing of class files as a data stream allows processing without requiring use of, for example, Java library utilities that may normally be required to conduct the file processing.

In an embodiment of the invention, the conversion of computer files to a data stream allows for the use of a protocol for both the data producer (the computer file processor) and the data consumer without creating a complete file representation, thereby simplifying the data structure. In an implementation for Java class files, the processing system operates with a class file data model, without requiring the addition of any major abstraction for data processing.

In an embodiment, the conversion of computer files to a serial data format may include, but is not limited to, the operation of a traversal of a hierarchical data structure or of a data archive as provided respectively in patent application Ser. No. 11/648,065, entitled "Computer File System Traversal", filed Dec. 30, 2006. Other processes for conversion of a set of files to a serial data stream may also be utilized in embodiments of the invention.

In an embodiment of the invention, for the processing of computer files it is assumed that processing occurs on an inner loop for critical processing stages. In an embodiment, a system requires high performance for inner loop of class file processing itself.

In an embodiment of the invention, processing is designed to provide sufficient performance for overall computer file processing. For example, in an embodiment a system includes stream buffering to buffer data as it is obtained and processed. In addition, an embodiment of the invention provides a compact internal file state in the data stream, thereby minimizing the amount of data that will be required in the process of transferring and processing the computer files.

In an embodiment of the invention, a data scanner may be provided in multiple implementations, depending on the system requirements. A data scanner may be a portion of a file processor. In one example, native processing implementations may be provided for a computer file scanner, with the native implementations being based upon relevant Java standards. In another example, a non-native implementation may be provided, as required. A particular non-native implementation may include a BCEL (Byte Code Engineering Library) implementation, with the BCEL API being a toolkit for the static analysis and dynamic creation or transformation of Java class files.

In an embodiment of the invention, a data consumer that receives generated annotation output data is a main framework expansion point for which neutral utility implementations might be required. In an embodiment of the invention, a file processor (the data producer) operates using the same data protocol as the data consumer protocol. In an embodiment of the invention, the data consumer may have control over the data to be provided to the data consumer. In an embodiment, the data producer and the data consumer may operate to agree on the data to be provided from the serial data stream. In an embodiment of the invention, a system may include complexity control, including configuring the file processor to deliver the data of interest. In an embodiment, the data of interest includes data meeting a certain degree of detail, or certain types of data. In an embodiment of the invention, the structure of the data processing may allow for a system to be utilized with loose semantics and implementation constraints. For example, the technical framework and protocol data types may be defined. However, there may be leeway for implementation characteristics, such as the result order sequence and analysis capabilities.

In an embodiment of the invention, file processing may be included within a set of tools that are provided to search files. The tools may, for example, provide for the conversion of files into serial form by a traversal process, the scanning of data for desired elements, and other related processes.

FIG. 1 is an illustration of an embodiment of processing of computer file data. In this illustration, a computer file conversion module 105 is provided to convert computer file data into a serial data stream 110. The computer file data may be, but is not limited to, Java class file program elements. The conversion of the computer file data may include, but is not limited to, the traversal of a hierarchical file or archive. The output of the processing of computer file data is a serial data stream 110 representing the computer file data.

In an embodiment, the serial data stream includes one more annotations. For example, the data stream 110 is illustrated as a series of program elements arriving as a data stream 130. In this data stream, there is a type definition prior to any elements within the type, and an annotation announcement occurs prior to any annotations. For example, Type1 135 is a first type definition, which is followed by program element Element1 140 within Type1. Element1 140 is associated with an annotation, with ANNO1 145 being a first annotation announcement for annotation value AnnoValue1 150. The data stream further includes a second type definition Type2 155, which includes program elements Element2 160 and Element3 165. Element3 165 is associated with a second annotation, as shown by second annotation announcement ANNO2 170 and annotation value AnnoValue2 175.

In an embodiment of the invention, the serial data stream 110 then is provided to a data scanner 115, which processes the data, including scanning the data stream for program elements of interest, including annotations to the program elements within the data stream. The scanner 115 may contain multiple modules or sub-modules, depending on the particular embodiment. The scanner 115 outputs an extracted data stream 120, which represents elements of the data stream that have been selected by the scanner 115. In this implementation, the extracted data stream would contain the annotated program elements and associated annotation values. The extracted data stream 120 then is eventually provided to a data consumer 125. The consumer 125 may receive additional reports or data processing as required for the needs of the consumer 125.

Figure 2:
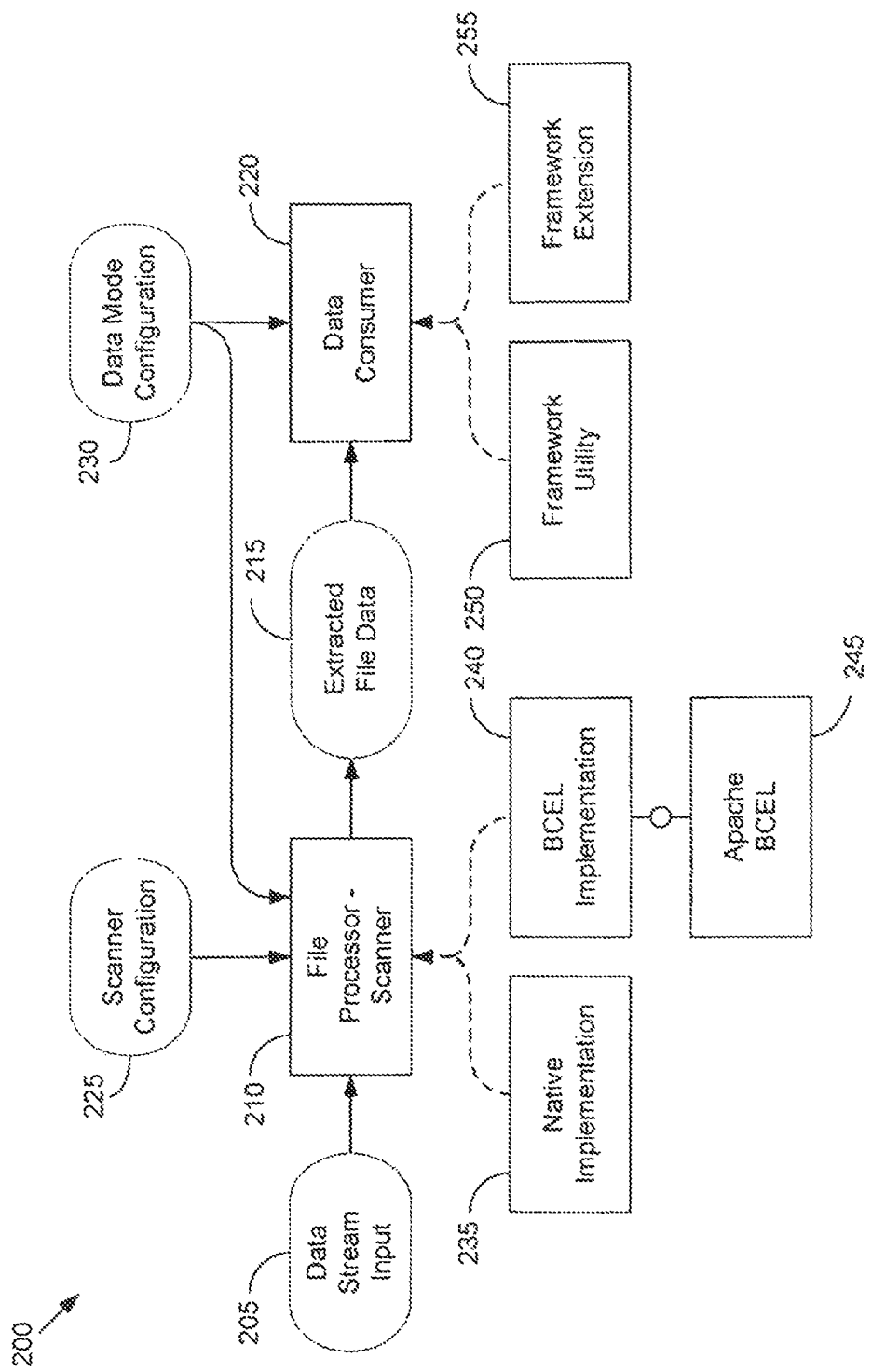
FIG. 2 is an illustration of a computer file processing system.

FIG. 2 is an illustration of a computer file processing system 200. While this illustration shows the processes occurring within a single system for simplicity in description, the processes may occur in multiple systems, including multiple systems within a network. In this illustration, a computer file data stream input 205 is provided to a file processor 210, which may include a scanner to scan the data for desired program elements. The data stream 205 may, for example, represent Java class file data that has been converted into a serial data stream. The file processor 210 may include multiple components, depending on the particular embodiment of the invention. The file processor 210 generates an extracted computer file data stream 215, which may be presented to a data consumer 220.

In an embodiment of the invention, the operation of the computer file processing system 200 is directed by certain inputs and settings. The operation of the file processor 210 may be directed by a scanner configuration 225. In addition, a data mode configuration 230 affects both the file processor 210 and the data consumer 220. The file processor 210 also may include one of multiple implementations. In particular embodiments, the implementation may be a native implementation 235 or a BCEL (Byte Code Engineering Library) implementation 240. The BCEL implementation 240 may include the Apache BCEL process 245, as developed by the Apache Software Foundation. In addition, the consumer 220 may utilize a framework utility 250 and a framework extension 255 in the operation of the computer file processing.

Figure 3:
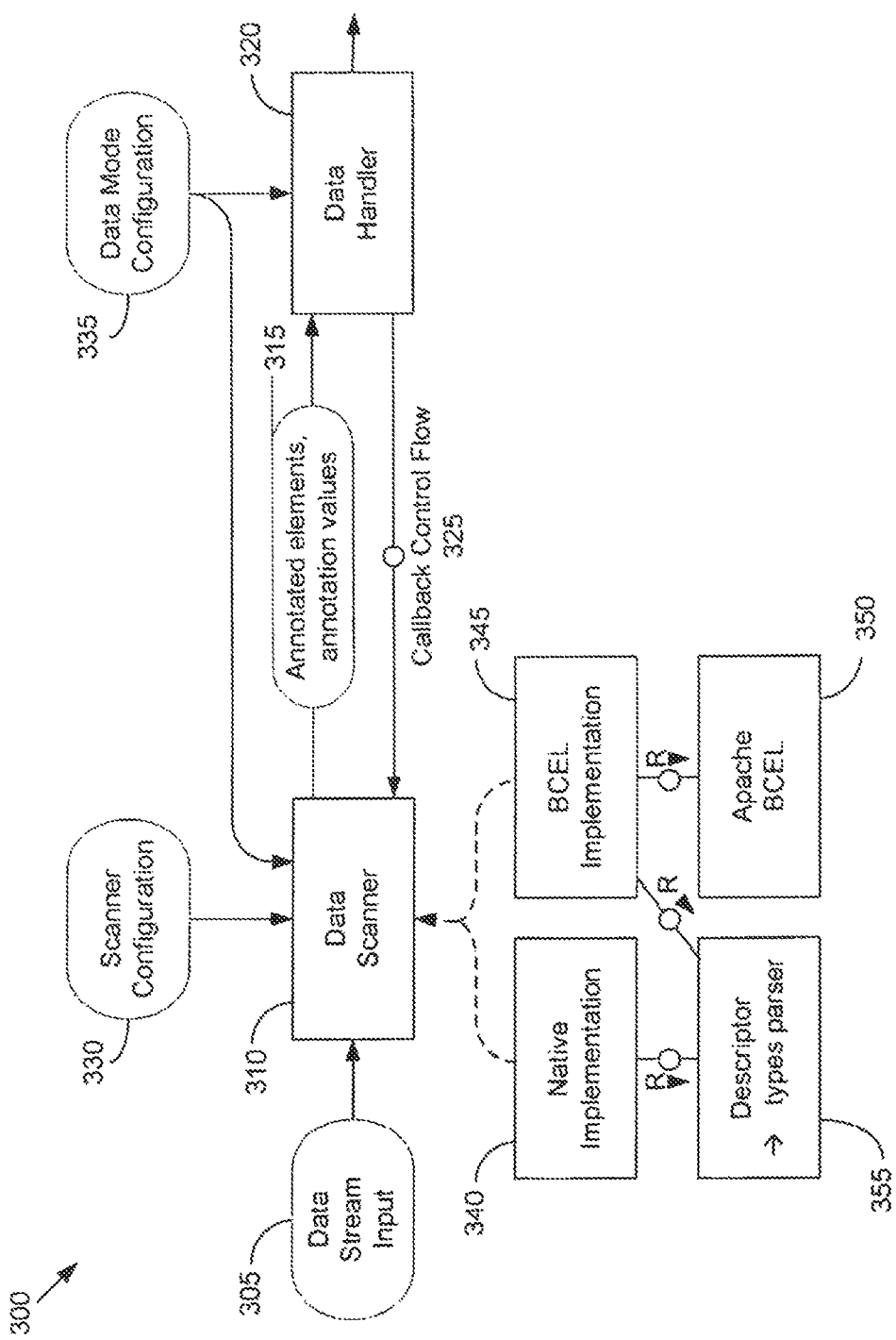
FIG. 3 is an illustration of an embodiment of a system to process annotated program elements.

FIG. 3 is an illustration of an embodiment of a system to process annotated program elements. The system 300 may include a data scanner 310 and a data handler 320. The data scanner 310 may, for example, represent the file processor 210 illustrated in FIG. 2 or a subpart of the file processor 210. The data handler 320 may represent the data consumer 220 illustrated in FIG. 2 or a subpart of the data consumer 210. In this illustration, the data scanner 310 is to scan a received data stream input 305 for annotations, and to produce a data stream containing selected annotated program elements and annotation values. The data handler 320 is to receive and handle the output of the scanner 310. The operation of the data handler includes the provision of feedback to the data scanner 315. As illustrated, in addition to any other functions, the data handler 320 provides a callback control flow 325 to inform the scanner whether particular program elements are desired. For example, the data scanner 310 may encounter a particular data type (such as a type description for a Java class file), and the data handler 320 may inform the data scanner 310 via the callback control flow 325 that annotations for the particular data type are not of interest. Upon being informed via the callback control flow 325 that annotations for the particular data type are not of interest, the data scanner 310 may then skip the elements in the data type.

The data scanner 310 may include a native implementation 340 and a BCEL implementation 345, illustrated with Apache BCEL 350. The implementations may be associated with a parsing module to parse type descriptors and identify the appropriate data types. Also illustrated are the scanner configuration 330 and the data mode configuration 335.

Figure 4:
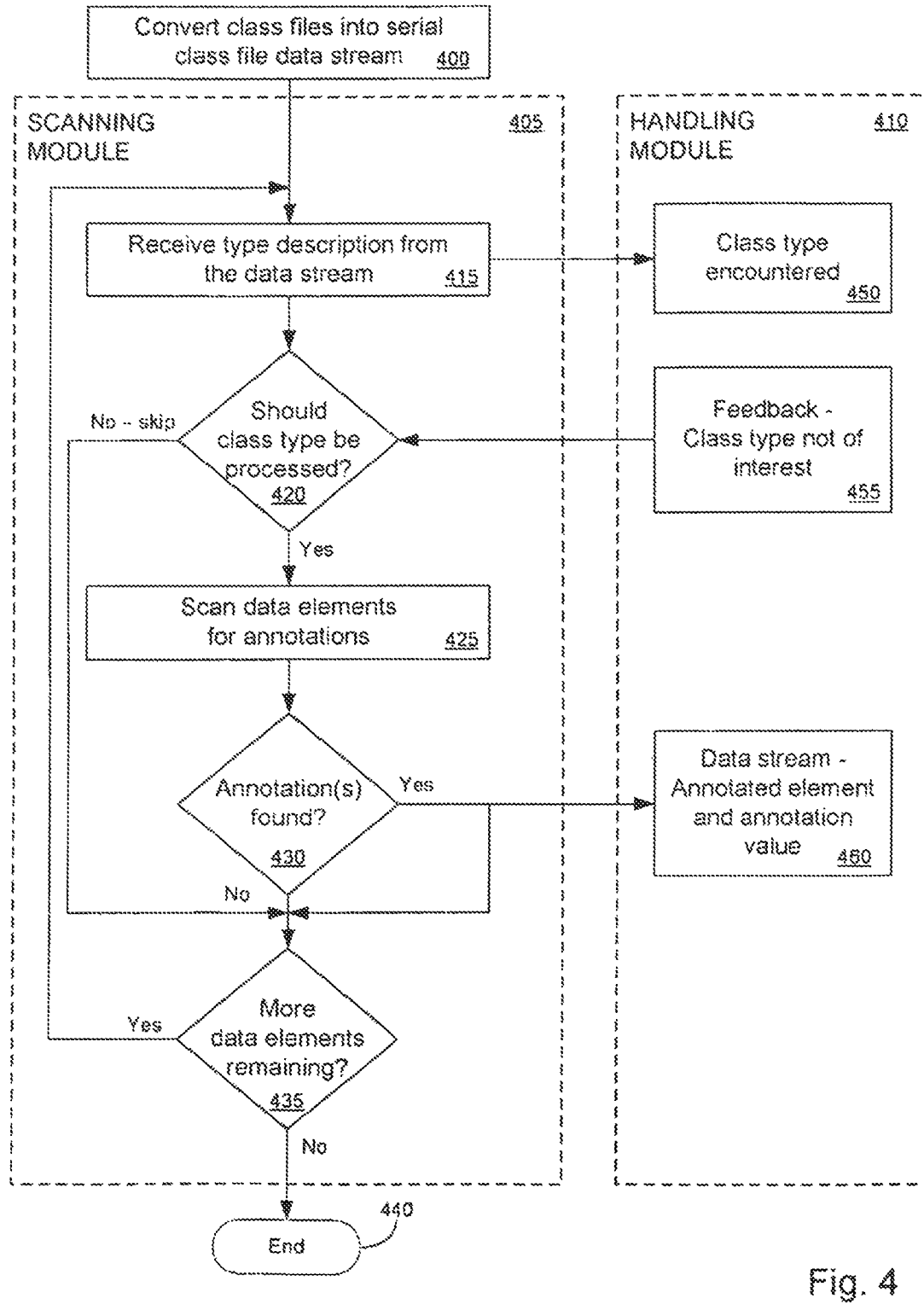
FIG. 4 is a flowchart to illustrate an embodiment of the scanning of a serial data stream for annotations to class file elements.

FIG. 4 is a flowchart to illustrate an embodiment of the scanning of a serial data stream for annotations to class file elements. In this illustration, a set of class files is converted into a serial class file data stream 400. The class file data stream may include, but is not limited to, a data stream generated through the traversal of a hierarchical file system or an archive.

The serial class file data stream 400 is received by a scanning module 405, which operates in conjunction with a handling module 410 to identify and output annotations of interest in the data stream. In this process, a particular type description is received in the data stream 415, and the handling module is informed regarding the class type that was encountered. There is then a determination whether the elements of the class type should be processed 420. This determination may be based at least in part on any feedback received from the handling module 410 indicating that the class type is not of interest 455. If the program elements in the class type should not be processed, then the elements in the class type are skipped and the process continues to a determination whether there are more program elements remaining 435. If the class is of interest, then the scanning module 405 scans the program elements for annotations 425.

If any annotations are found 430, then a data stream provided to the handling module 410 includes the annotated element and the annotation value 445. When no more program elements remain in the received data stream, then the process ends 440. The processing of program elements may include other processes not illustrated here, depending on the embodiment of the invention.

Figure 5:
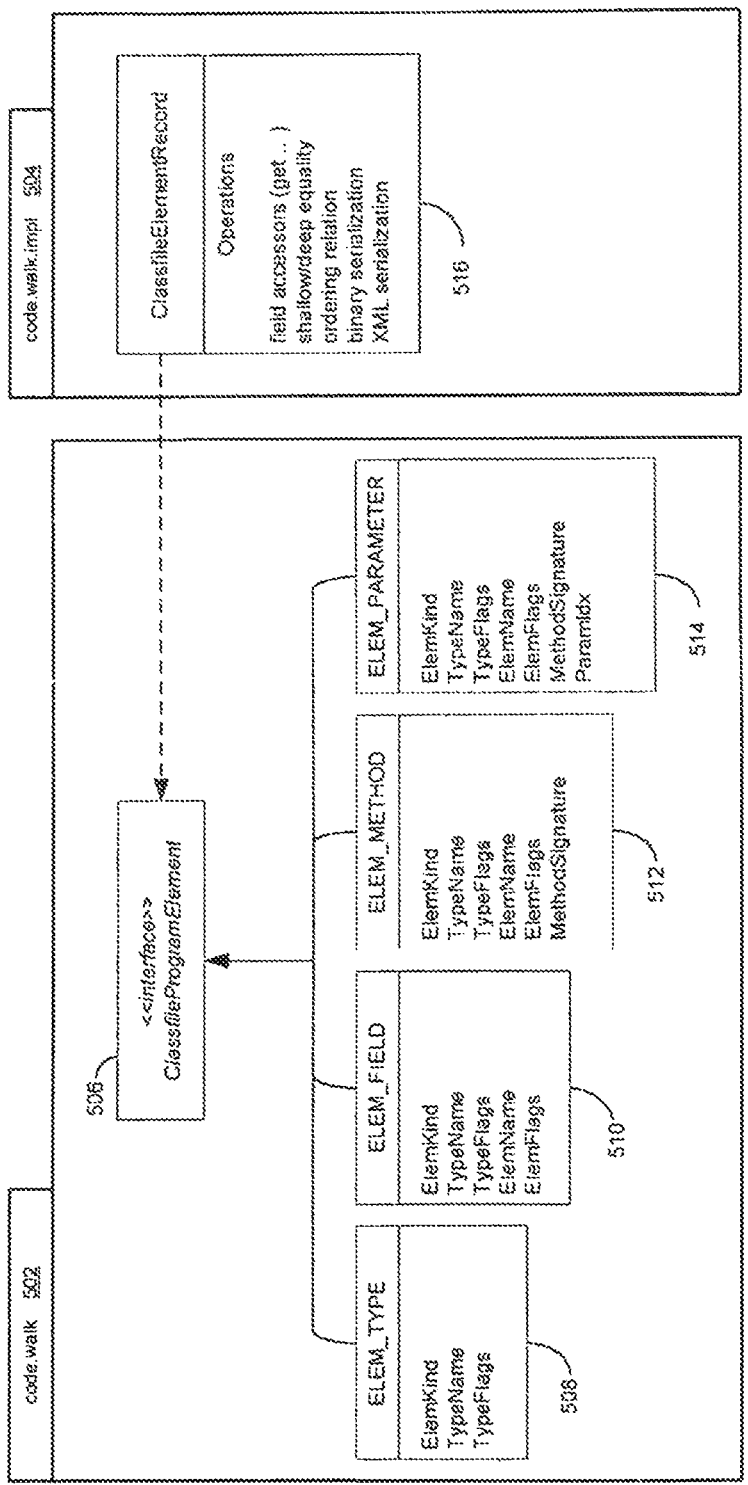
FIG. 5 is an illustration of an embodiment of a class file program element as a data stream.

FIG. 5 is an illustration of an embodiment of a class file program element as a data stream. In this illustration, a class file program element 506 is shown within a code walk module 502 (used in the traversal of class files). The class file program element 506 is represented by an element type 508 (including an element kind, type name, and type flags), an element field 510 (also including an element name and element flags), and one or more element methods 512 (also including a method signature), and an element parameter 514 (paramIdx). The element further includes a class file element record 516 in the code walk implementation 504, including one or more operations (defining field accessors, shallow or deep equality, ordering relation, binary serialization, and XML serialization).

Figure 6:
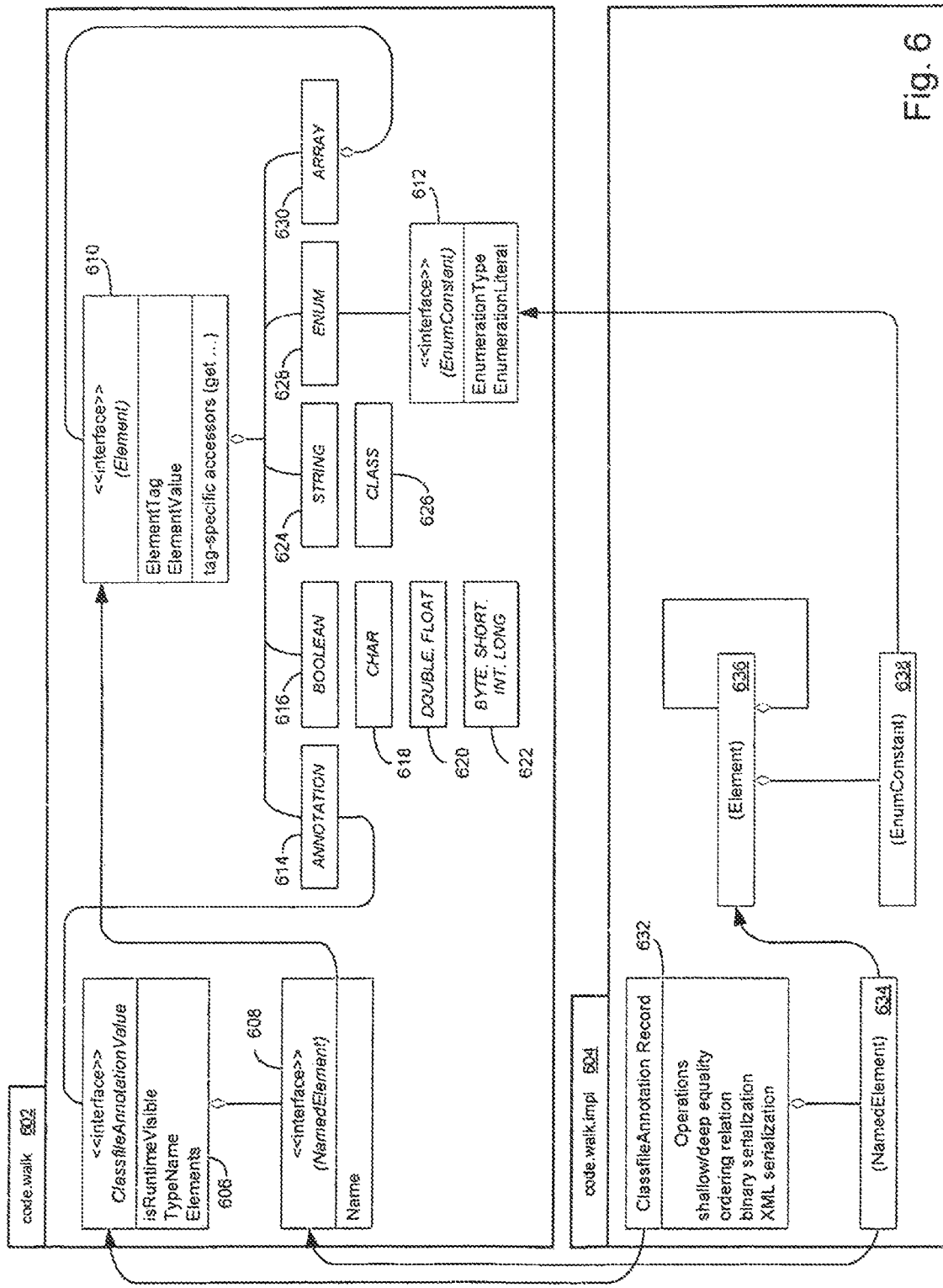
FIG. 6 is an illustration of an embodiment of an annotation to a class file program element presented as a data stream.

FIG. 6 is an illustration of an embodiment of an annotation to a class file program element presented as a data stream. In this illustration, an annotation is represented in the code walk 602 as a class file annotation value 606, including whether the value is visible at runtime, a type name, and the annotation elements. The class file annotation value 606 is related to a particular named program element 608, which includes the element name. The annotated program element 610 includes the element tag and element value, as well as tag-specific accessors. The program element 610 is shown in relation to the annotation 614, as well as either Boolean 616, char (character) 618, double, float 620, byte, short, int (integer), or long 622. The program element further may include a string 624 or class 626, an enum (enumeration constant) 628, and an array 630. The enumeration constant 628 is illustrated 612 as including an enumeration type and enumeration literal.

The annotation is further illustrated as a class file annotation record 632 in a code walk implementation 604. The class file annotation record 632 includes operations, including shallow or deep equality, the ordering relation, binary serialization, and XML serialization 632. The class file annotation record 632 is shown in relation with the named element 634. Also illustrated are the annotated element 636 and the enumeration constant 638.

Figure 7:
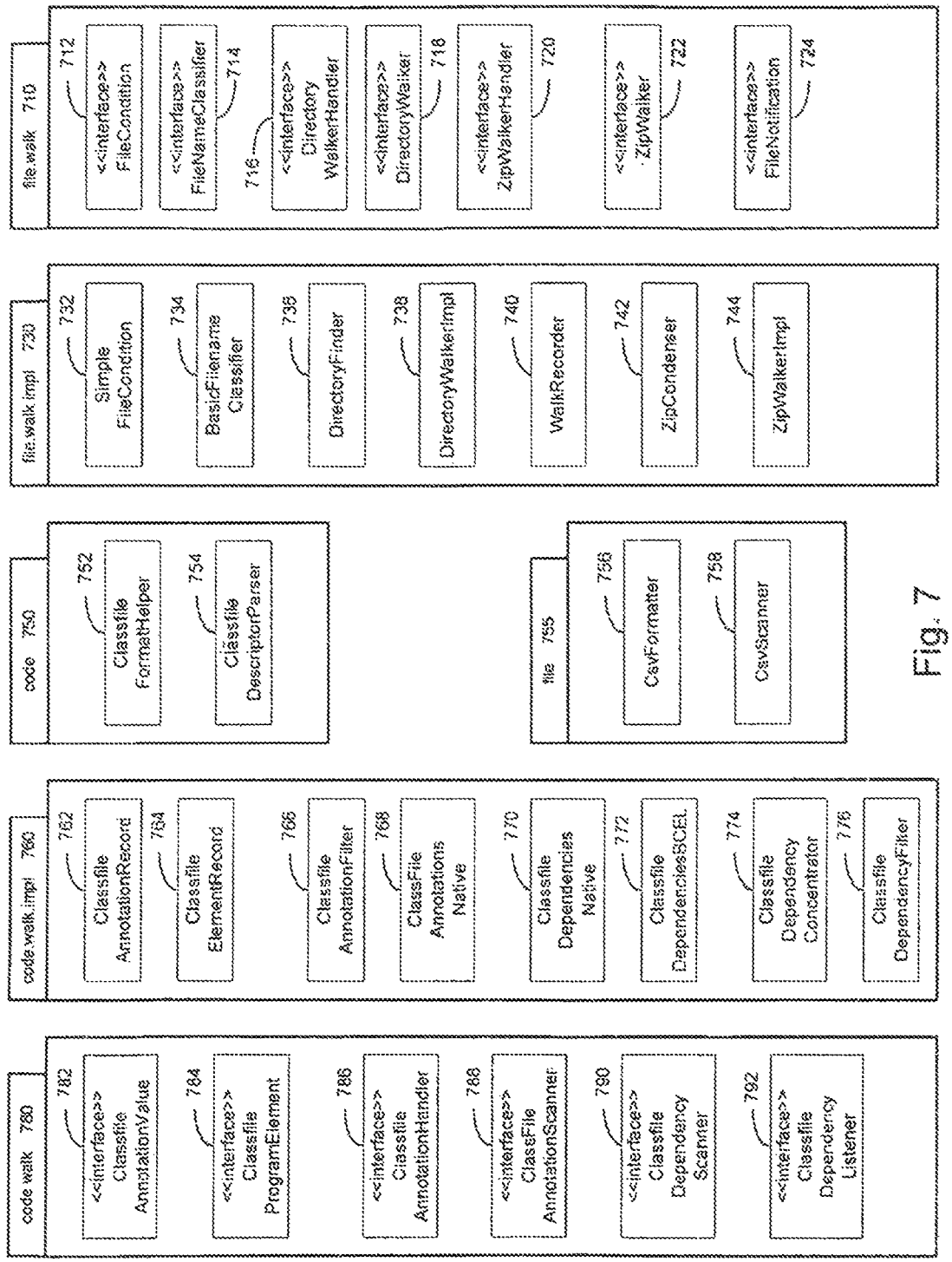
FIG. 7 is an embodiment of library utilities.

FIG. 7 is an embodiment of library utilities. FIG. 7 may illustrate software modules, hardware modules, or modules including a combination of software and hardware. In this illustration, the utilities relate to an interface layer comprising code walk interfaces (code.walk 780); for class file processing and file walk interfaces (file.walk 710) for locating files; and further to an implementation toolbox comprising code processing 750 and a code walk implementation (code.walk.impl 760) for class file processing, and file processing 755 and a file walk implementation (file.walk.impl 730) for locating files.

In the interface layer, the code walk interfaces 780 may include a class file annotation value interface module 782, a class file program element interface module 784, a class file annotation handler interface module 786, a class file annotation scanner interface module 788, a class file dependency scanner interface module 790, and a class file dependency listener interface module 792. The file walk interfaces then may include a file condition interface module 712, a file name classifier interface module 714, a directory walker handler interface module 716, a directory walker interface module 718, a zip walker handler interface module ("zip" indicating use for archives) 720, a zip walker interface module 722, and a file notification interface module 724.

In an embodiment of the invention, the code processing 750 may provide for parsing types from class file descriptors. Code processing 750 may include a class file format helper module 752 and a class file descriptor parser module. The code walk implementation 760 for class file processing may include a class file annotation record module 762, a class file element record module 764, a class file annotation filter 766, a class file annotation for native elements 768, a class file dependencies module for native elements 770, a class file dependencies module for BCEL (Byte Code Engineering Library) elements 772, a class file dependency concentrator module 774, and a class file dependency filter 776.

In an embodiment of the invention, the file processing 755 may include a comma separated value (CSV) formatter and a CSV scanner. The file walk implementation 730 for locating files may include a simple file condition module 732, a basic file name classifier module 734, a directory finder module 736, a directory walker implementation module 738, a walk recorder module 740, a zip (archive) condenser module 742, and a zip walker implementation module 744.

Figure 8:
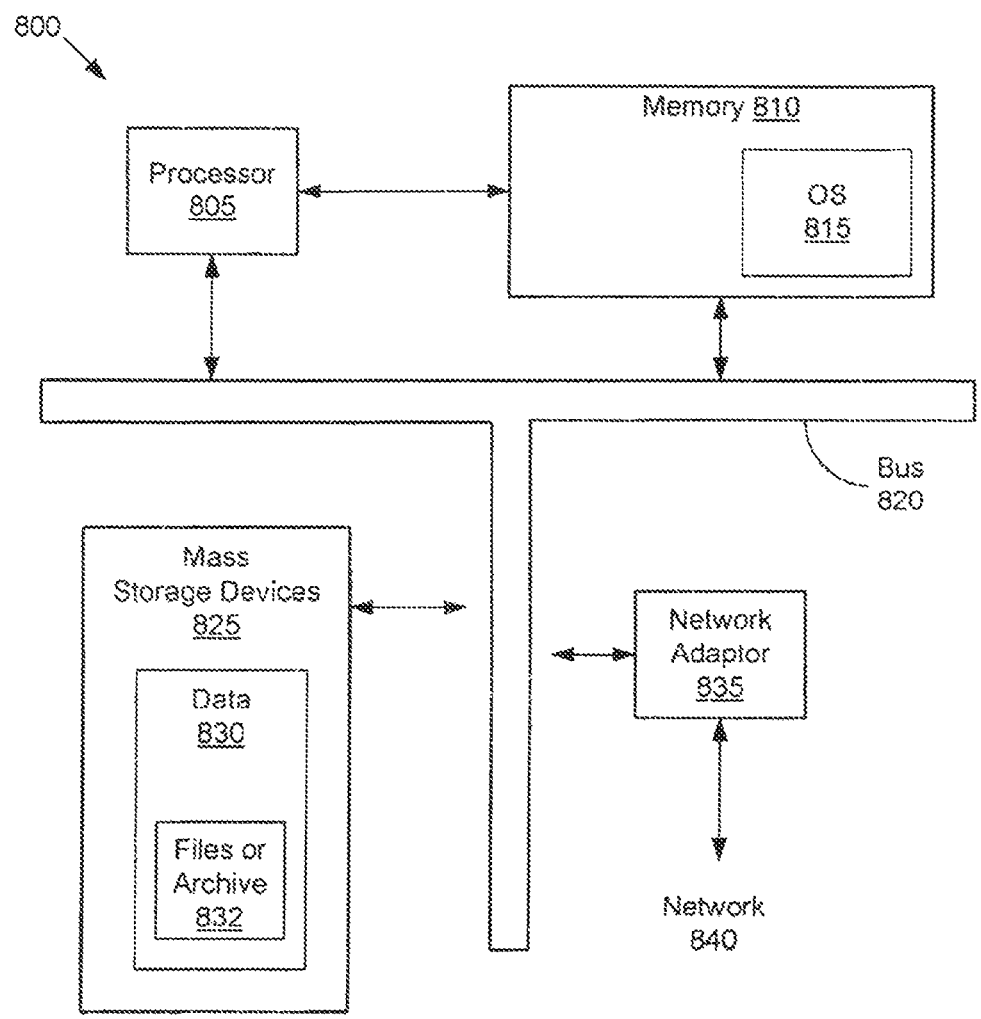
FIG. 8 is an illustration of a computer system in an embodiment of the invention.

FIG. 8 is an illustration of a computer system in an embodiment of the invention. The computer system may be utilized as a system for processing of computer files in the form of a data stream, or may represent one of multiple systems used in such processing. The computing system illustrated in FIG. 8 is only one of various possible computing system architectures, and is a simplified illustration that does include many well-known elements. As illustrated, a computing system 800 can execute program code stored by an article of manufacture. Computer system 800 may be a J2EE system, ABAP system, or administration system. A computer system 800 includes one or more processors 805 and memory 810 coupled to a bus system 820. The bus system 820 is an abstraction that represents any one or more separate physical buses, point-to-point connections, or both connected by appropriate bridges, adapters, or controllers. The bus system 820 may include, for example, a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 8, the processors 805 are central processing units (CPUs) of the computer system 800 and control the overall operation of the computer system 800. The processors 805 execute software stored in memory 810. A processor 805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 810 is or includes the main memory of the computer system 800. Memory 810 represents any form of random access memory (RAM), read-only memory (ROM), flash memory, or the like, or a combination of such devices. Memory 810 stores, among other things, the operating system 815 of the computer system 800.

Also connected to the processors 805 through the bus system 820 are one or more mass storage devices 825 and a network adapter 835. Mass storage devices 825 may be or may include any conventional medium for storing large volumes of instructions and data 830 in a non-volatile manner, such as one or more magnetic or optical based disks. In an embodiment of the invention, the mass storage devices may include storage of file or an archive 832 that requires processing. In an embodiment of the invention, the processors 805 may operate to traverse the files or archive 832, the traversal of the files or archive 832 resulting in output of a serial data stream representing selected elements of the archive. The processor 805 may scan the serial stream for desired program elements within the computer files. In another embodiment the computer system 800 may provide for the conversion of the computer files into a serial data stream, while another system or systems is responsible for scanning the data stream for desired program elements.

The network adapter 835 provides the computer system 800 with the ability to communicate with remote devices, over a network 840 and may be, for example, an Ethernet adapter. In one embodiment, the network adapter may be utilized to output data including, for example, an extracted serial data stream representing selected elements of the files or archive 832.

Figure 9:
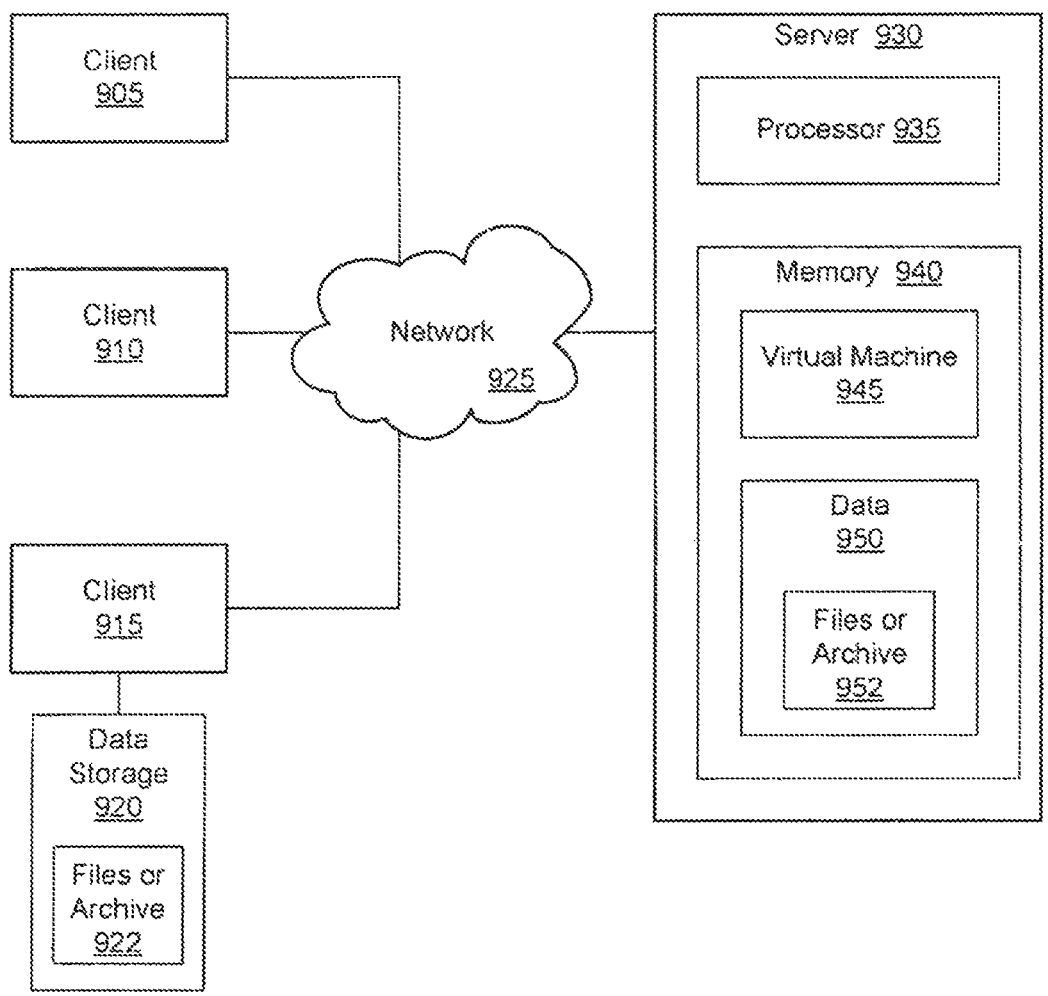
FIG. 9 illustrates an embodiment of a client-server network system.

FIG. 9 illustrates an embodiment of a client-server network system. As illustrated, a network 925 links a server 930 with client systems 905, 910, and 915. Client 915 may include certain data storage 920, including computer files in the form of, for example, a computer file hierarchy or computer archive 922. Server 930 includes programming data processing system suitable for implementing apparatus, programs, and/or methods in accordance with one or more embodiments of the present invention. Server 930 includes processor 935 and memory 940. Server 930 provides a core operating environment for one or more runtime systems, including, for example, virtual machine 945, at memory 940 to process user requests. Memory 940 may include a shared memory area that is accessible by multiple operating system processes executing in server 930. For example, virtual machine 945 may include an enterprise server (e.g., a J2EE-compatible server or node, Web Application Server developed by SAP AG, WebSphere Application Server developed by IBM Corp. of Armonk, N.Y., and the like). Memory 940 can be used to store an operating system, a Transmission Control Protocol/Internet Protocol (TCP/IP) stack for communicating over network 925, and machine executable instructions executed by processor 935. The memory 945 may also include data 950 for processing, including the processing of data that includes data of one or more computer file hierarchies or computer archives 952. In an embodiment, the data has been converted into a serial data stream for processing. In some embodiments, server 935 may include multiple processors, each of which can be used to execute machine executable instructions.

Client systems 905-915 may execute multiple application or application interfaces. Each instance or application or application interface may constitute a user session. Each user session may generate one or more requests to be processed by server 930. The requests may include instructions or code to be executed on a runtime system, such as virtual machine 945 on server 930.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   accessing at least one computer file including a plurality of object-oriented program elements and annotation values corresponding to one or more of the program elements;
   converting the accessed plurality of object-oriented program elements and annotation values in the at least one computer file into a data stream comprising the program elements of the at least one computer file and the annotation values corresponding to one or more of the program elements by inserting a data type description for a class type before each of a contiguous group of the program elements of a same class type;
   scanning the data stream to determine whether to process program elements in the data stream being scanned based on feedback received from a handler component indicating that a data type description is not of interest;
   based on determining that the program elements should be processed, processing the program elements to identify annotated program elements and annotated values of the identified annotated program elements to be included in an extracted data stream; and
   upon receiving feedback from the handler component indicating that a data type description is not of interest, skipping contiguous program elements of a same class type following a data type description that matches a data type description indicated in the feedback such that the contiguous program elements are not processed for inclusion in the extracted data stream.

2. The method of claim 1, wherein each of the plurality of object-oriented program elements comprises a Java class file.

3. The method of claim 1, wherein processing the program elements comprises providing the data stream to a parser to parse the data type descriptions in the data stream.

4. The method of claim 1, wherein the at least one computer file comprises a hierarchical file structure and converting the at least one computer file into the data stream comprises traversing the at least one computer file, wherein traversing the at least one computer file includes processing each of the plurality of object-oriented program elements reached in the traversal only once without considering any of the program elements that have not yet been reached in the traversal.

5. The method of claim 4, wherein the hierarchical file structure organizes the plurality of object-oriented program elements as a root node, one or more intermediate nodes representing a folder with one or more nodes below the intermediate node in the same branch of the hierarchical file structure, and one or more leaf nodes representing a file entry.

6. The method of claim 1, wherein a scanner component processes the program elements to identify annotated program elements and annotated values of the identified annotated program elements to be included in an extracted data stream.

7. The method of claim 1, wherein determining whether to process program elements in the data stream further comprises scanning the data stream to determine program elements of a selected data type based on the inserted data type descriptions.

8. The method of claim 1, further comprising:
   generating the extracted data stream comprising the identified annotated program elements and annotated values.

9. A system comprising:
   one or more processors; and
   a non-transitory computer-readable storage medium comprising instructions that, when executed by the one or more processors, cause the system to perform operations comprising:
   accessing at least one computer file including a plurality of object-oriented program elements and annotation values corresponding to one or more of the program elements;
   converting the accessed plurality of object-oriented program elements and annotation values in the at least one computer file into a data stream comprising the program elements of the at least one computer file and the annotation values corresponding to one or more of the program elements by inserting a data type description for a class type before each of a contiguous group of the program elements of a same class type;
   scanning the data stream to determine whether to process program elements in the data stream being scanned based on feedback received from a handler component indicating that a data type description is not of interest;
   based on determining that the program elements should be processed, processing the program elements to identify annotated program elements and annotated values of the identified annotated program elements to be included in an extracted data stream; and
   upon receiving feedback from the handler component indicating that a data type description is not of interest, skipping contiguous program elements of a same class type following a data type description that matches a data type description indicated in the feedback such that the contiguous program elements are not processed for inclusion in the extracted data stream.

10. The system of claim 9, wherein each of the plurality of object-oriented program elements comprises a Java class file.

11. The system of claim 9, wherein the at least one computer file comprises a hierarchical file structure and converting the at least one computer file into the data stream comprises traversing the at least one computer file, wherein traversing the at least one computer file includes processing each of the plurality of object-oriented program elements reached in the traversal only once without considering any of the program elements that have not yet been reached in the traversal.

12. The system of claim 11, wherein the hierarchical file structure organizes the plurality of object-oriented program elements as a root node, one or more intermediate nodes representing a folder with one or more nodes below the intermediate node in the same branch of the hierarchical file structure, and one or more leaf nodes representing a file entry.

13. The system of claim 9, wherein a scanner component processes the program elements to identify annotated program elements and annotated values of the identified annotated program elements to be included in an extracted data stream.

14. The system of claim 9, wherein determining whether to process program elements in the data stream further comprises scanning the data stream to determine program elements of a selected data type based on the inserted data type descriptions.

15. The system of claim 9, the operations further comprising:
 generating the extracted data stream comprising the identified annotated program elements and annotated values.

16. A non-transitory computer-readable storage medium comprising instructions that, when executed by at least one processor of a machine, cause the machine to perform operations comprising:
 accessing at least one computer file including a plurality of object-oriented program elements and annotation values corresponding to one or more of the program elements;
 converting the accessed plurality of object-oriented program elements and annotation values in the at least one computer file into a data stream comprising the program elements of the at least one computer file and the annotation values corresponding to one or more of the program elements by inserting a data type description for a class type before each of a contiguous group of the program elements of a same class type;
 scanning the data stream to determine whether to process program elements in the data stream being scanned based on feedback received from a handler component indicating that a data type description is not of interest;
 based on determining that the program elements should be processed, processing the program elements to identify annotated program elements and annotated values of the identified annotated program elements to be included in an extracted data stream; and
 upon receiving feedback from the handler component indicating that a data type description is not of interest, skipping contiguous program elements of a same class type following a data type description that matches a data type description indicated in the feedback such that the contiguous program elements are not processed for inclusion in the extracted data stream.

17. The computer-readable storage medium of claim 16, wherein each of the plurality of object-oriented program elements comprises a Java class file.

18. The computer-readable storage medium of claim 16, wherein the data stream is provided to a parser to parse the data type descriptions in the data stream.

19. The computer-readable storage medium of claim 16, wherein a scanner component processes the program elements to identify annotated program elements and annotated values of the identified annotated program elements to be included in an extracted data stream.

20. The computer-readable storage medium of claim 16, wherein determining whether to process program elements in the data stream further comprises scanning the data stream to determine program elements of a selected data type based on the inserted data type descriptions.

* * * * *